United States Patent [19]
Weinstock et al.

[11] 3,972,261
[45] Aug. 3, 1976

[54] ROCKET CATAPULT APPARATUS

[75] Inventors: Manuel Weinstock, Philadelphia, Pa.; Frank T. Pisano, Voorhees, N.J.

[73] Assignee: The United States of America as represented by the Secretary of the Army, Washington, D.C.

[22] Filed: Oct. 3, 1974

[21] Appl. No.: 511,877

[52] U.S. Cl. ............... 89/1.813; 89/1.815; 89/1.819; 244/122 AD
[51] Int. Cl.² ............ B64D 25/10; F41F 3/06
[58] Field of Search... 244/122 A, 122 AB, 122 AC, 244/122 AD, 122 AE; 89/1.8, 1.813, 1.814, 1.815, 1.816, 1.819

[56] References Cited
UNITED STATES PATENTS

| | | | |
|---|---|---|---|
| 2,726,831 | 12/1955 | Bleck et al. | 244/122 A |
| 2,815,008 | 12/1957 | Hirt | 244/122 AC X |
| 2,998,213 | 8/1961 | Pitts | 244/122 AD |
| 3,106,864 | 10/1963 | Seedlock et al. | 89/1.813 |
| 3,706,434 | 12/1972 | Martin | 244/122 AD |

FOREIGN PATENTS OR APPLICATIONS

| | | | |
|---|---|---|---|
| 1,193,945 | 11/1959 | France | 89/1.815 |

*Primary Examiner*—David H. Brown
*Attorney, Agent, or Firm*—Nathan Edelberg; Robert P. Gibson; William Sommer

[57] ABSTRACT

A rocket catapult arrangement having an erector mechanism to move the rocket catapult from an out-of-the-way prone position to an upright firing position immediately before launch. When employed as emergency escape means for a seat-occupant mass of a disabled aircraft, the arrangement prior to need for ejection, enables use of available space other than its upright firing position which usually is a sight obstacle for a pilot or an occupant of a rearwardly adjacent seat.

3 Claims, 3 Drawing Figures

ROCKET CATAPULT APPARATUS

The invention described herein may be manufactured, used, and licensed by or for the Government for governmental purpose without payment to us of any royalty thereon.

This invention relates to rocket catapults, and more particularly to a rocket catapult arrangement utilized for emergency ejection of the occupant seat mass in a disabled aircraft.

Heretofore, in aircraft expandable longitudinally aligned, multiple occupant seats, the rocket catapult emergency ejection means for the forwardmost seat occupant has been a sight obstacle for the pilot or occupant of the rearwardly adjacent seat.

It is an object of the invention to provide a rocket catapult arrangement for emergency ejection of an occupant seat mass of a disabled aircraft in which the ejection means is pre-operationally located in an available non-obstructing space.

Another object of the invention is to provide an arrangement having an erector mechanism to move the ejection means to an upright firing position immediately before launch.

A further object of the invention is to provide such an arrangement that enables the use of an economized structure.

These and other objects, features and advantages will become more apparent from the following description and accompanying drawings in which.

Figure 1:
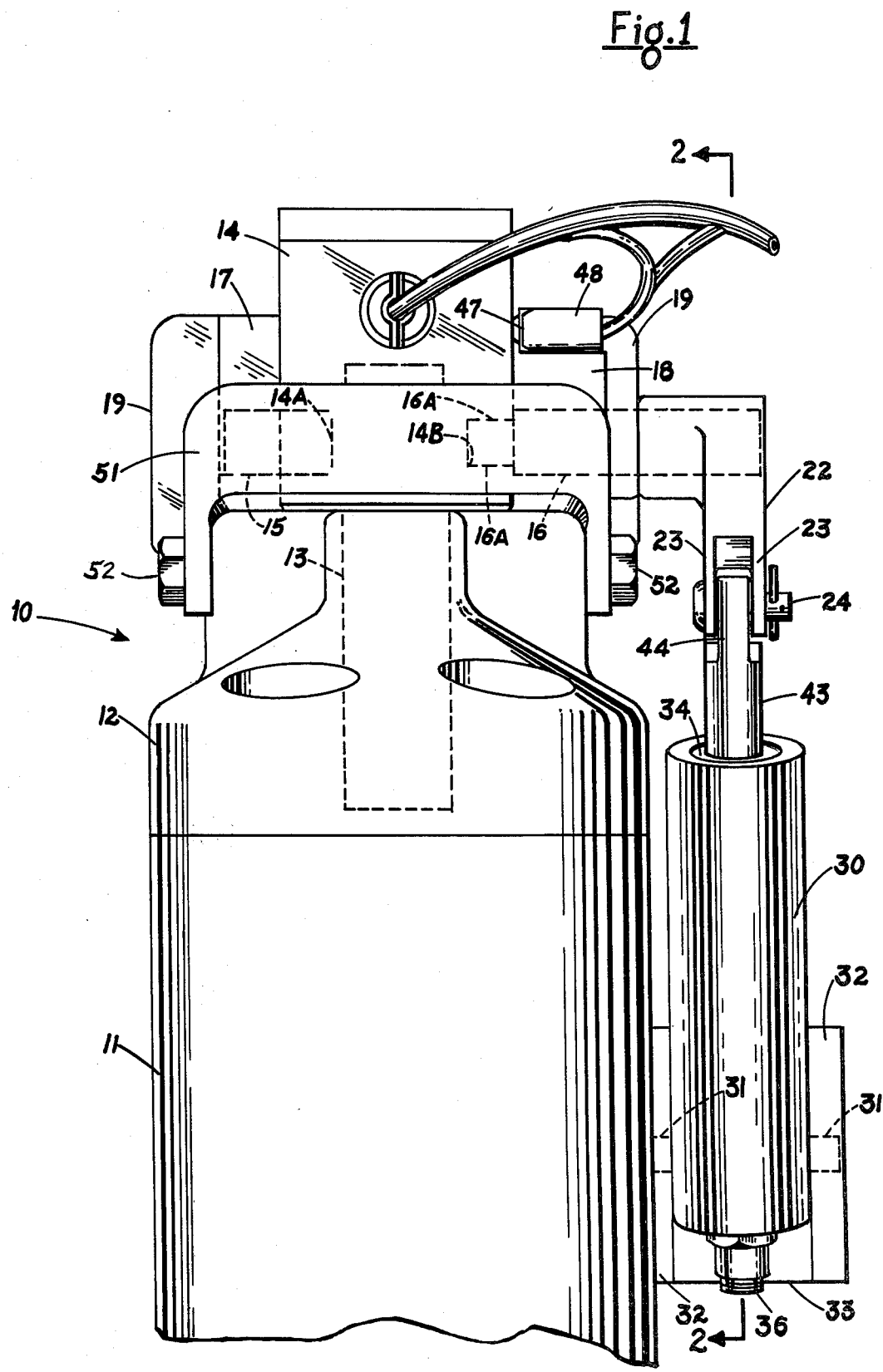
FIG. 1 is a top plan view of a preferred rocket catapult arrangement in pre-operational position and embodying the principles of the invention.
Figure 2:
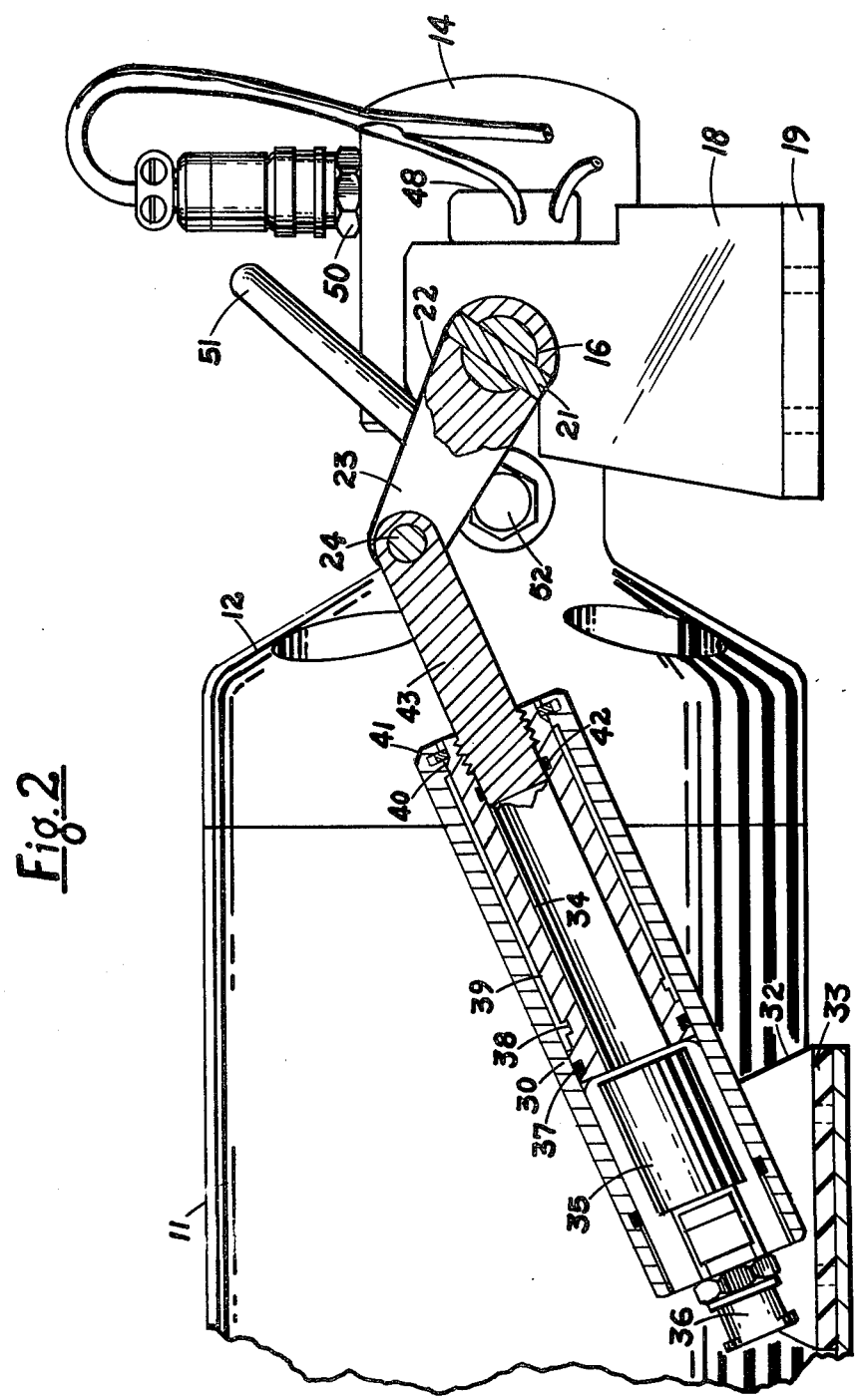
FIG. 2 is a sectional view taken along line 2—2 of FIG. 1.

The rocket catapult arrangement, shown generally at 10 (FIG. 1), includes a rocket motor 11 having a rocket nozzle portion 12 slidably mounted on and initially latched to a launch or catapult tube 13 (partially shown in phantom) which is appropriately secured to trunnion 14. A pair of diametrically opposed, transversely aligned cylindrical shaft portions 15, 16 are suitably journalled in a corresponding one of two laterally spaced uprights 17, 18 upstanding on a first base member 19. Shaft 15 is force-fittingly secured in an appropriately dimensioned trunnion recess 14A, and the innermost end of shaft 16 has a pair of opposed key surfaces or flats 16A, 16A for closely fitting in a suitable non-circular recess 14B provided in the sidewall of the trunnion 14. The outer end of shaft 16 is secured by pin 21 (FIG. 2) to crank arm 22 which is slotted at its other end to define bifurcated legs 23, 23 that are transversely apertured for slidably receiving connecting or journal pin 24 for a purpose to be described.

Figure 3:
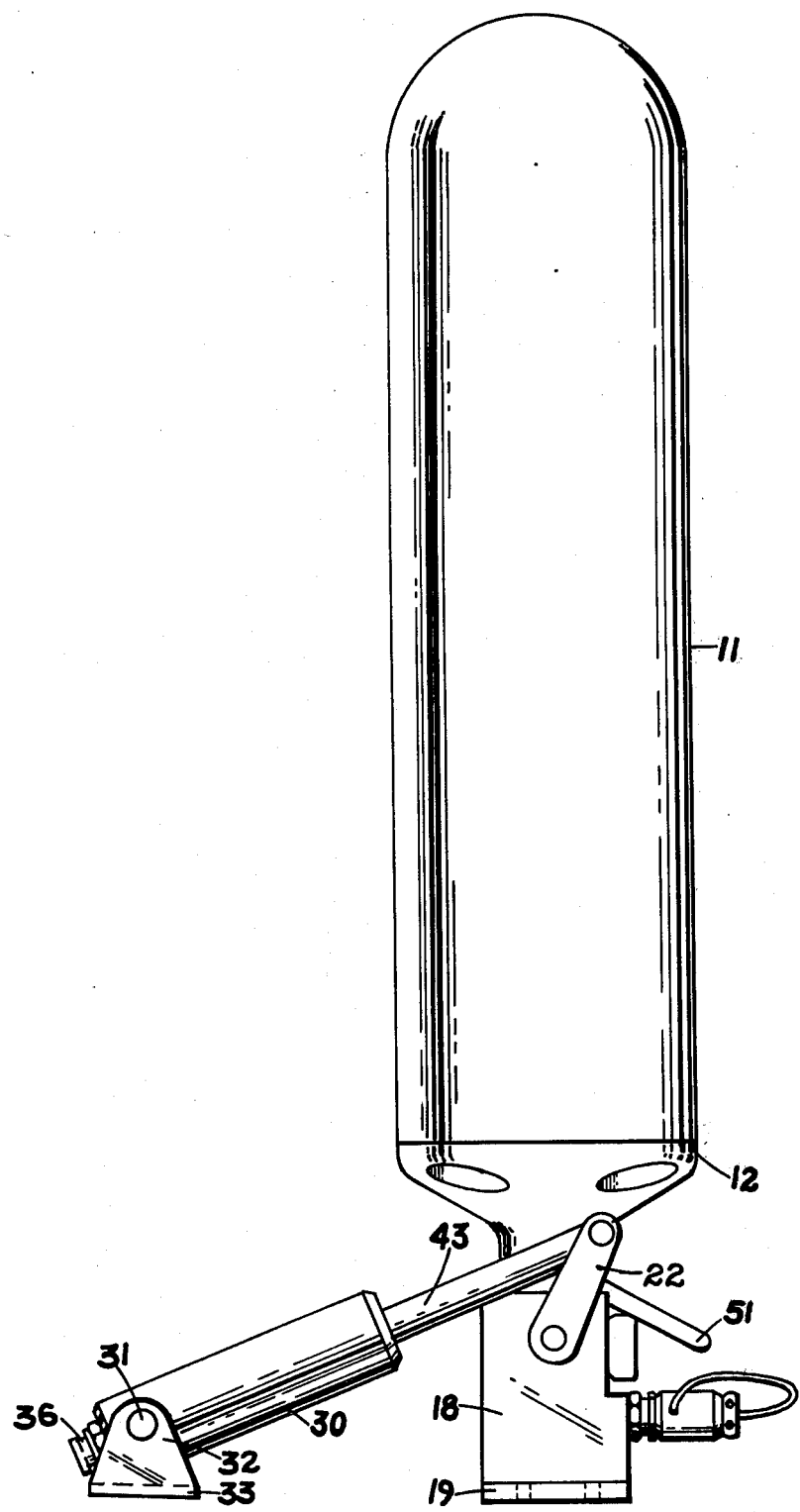
FIG. 3 is a side elevational view of the FIG. 1 arrangement in rocket motor launching position.

An erector cylinder 30, having a pair of diametrically opposed stub shafts 31, 31 (FIGS. 1,3), is freely journalled in suitably apertured, laterally spaced bearing upright or bracket portions 32, 32 of a second base member 33. A piston 34, slidably mounted in cylinder 30, is actuated by propellant cartridge 35 that is ignited by a suitable electric ignition element 36 and mounted in the cylinder adjacent the end of the piston most remote from the crank arm 22. At the head end the piston carries an O-ring seal 37 just behind an annular transverse groove 38 provided in the reduced cylindrical external surface 39 which extends a substantial length of piston 34 and terminates at the other end in a further reduced portion and an intermediate tapered or annular camming surface 40 adapted to expand locking ring 41 in a cylinder forward internal surface groove until it snaps into piston groove 38 at the end of the piston stroke. The internal surface of the hollow piston 34 carries an appropriate O-ring seal 42 and has a threaded end portion to which one end of piston rod 43 is secured. The other end of the piston rod 43 has a reduced portion 44 with a suitable transverse aperture for connection to the crank bifurcated leg portion 23 by journal pin 24 which is provided with an appropriate cotter pin.

The predetermined operational stroke of piston 34 is such that, through the key or drive connection between the crank arm 22 and trunnion 14, the rocket motor 11 will be erected from a prone position to an upright position immediately prior to launch. As the trunnion swings clear of the previously depressed plunger or switch release button 47, switch 48 will close the electric circuit to fire electric igniter 50 for ballistically launching the rocket motor 11 and ejecting its associated occupant seat mass from a disabled aircraft. During such emergency egression, the U-shaped bridal 51, which is secured to the rocket nozzle portion 12 by screw bolts 52, is connected to an occupant harness by a pendant line (not shown).

Various modifications, changes or alterations may be resorted to without departing from the scope of the invention as defined in the appended claims.

We claim:

1. A rocket catapult arrangement having a rocket nozzle portion of a rocket motor slidably mounted on a launch tube secured in a trunnion, shaft means secured to said trunnion and journalled in a first base member.

a crank arm secured to said shaft means, an erector cylinder freely journalled in a second base member and having a cartridge actuated piston slidable therein, a piston rod secured to said piston and connected to said crank arm, and a locking ring expandabe in a forward internal surface of said cylinder, said piston having an annular cam surface for expanding said ring and an annular groove in an external surface of said piston forward of its head portion for receiving said locking ring when the piston has completed its stroke and said tunnion and rocket motor have completed a predetermined amount of rotation with said crank arm, said first base member having a base portion and a pair of laterally spaced upright portions integral therewith said shaft means including a pair of diametrically opposed shaft portions, one of said shaft portions being journalled in one of said base upright portions, and the other one of said shaft portions being journalled in the other of said base upright portions and having means securing said trunnion to said crank arm for movement with said other shaft portion.

2. The structure of claim 1 wherein said second base member has a base portion and a pair of laterally spaced bearing uprights, and diametrically opposed shafts integral with said erector cylinder are journalled in corresponding ones of said bearing uprights.

3. The structure of claim 1 wherein said trunnion carries means for actuating said rocket motor after predetermined movement to an upright position.

\* \* \* \* \*